United States Patent
Eilam et al.

(10) Patent No.: US 9,483,250 B2
(45) Date of Patent: Nov. 1, 2016

(54) SYSTEMS MANAGEMENT BASED ON SEMANTIC MODELS AND LOW-LEVEL RUNTIME STATE

(71) Applicant: International Business Machines Corporation, Armonk, NY (US)

(72) Inventors: Tamar Eilam, New York, NY (US); Fabio A. Oliveira, White Plains, NY (US); Florian Rosenberg, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 14/485,822

(22) Filed: Sep. 15, 2014

(65) Prior Publication Data

US 2016/0077816 A1 Mar. 17, 2016

(51) Int. Cl.
*G06F 9/44* (2006.01)
*G06F 9/445* (2006.01)

(52) U.S. Cl.
CPC .. *G06F 8/65* (2013.01); *G06F 8/60* (2013.01)

(58) Field of Classification Search
CPC ........................................................ G06F 8/60
USPC ......................................................... 717/177
See application file for complete search history.

(56) References Cited

U.S. PATENT DOCUMENTS

| | | | |
|---|---|---|---|
| 6,871,345 B1 * | 3/2005 | Crow et al. .................... | 717/175 |
| 7,530,081 B2 * | 5/2009 | Joseph ........................... | 719/330 |
| 7,562,339 B2 * | 7/2009 | Racca et al. ................... | 717/102 |
| 7,788,536 B1 * | 8/2010 | Qureshi et al. ............ | 714/38.14 |
| 7,996,814 B1 | 8/2011 | Qureshi et al. | |
| 8,001,527 B1 | 8/2011 | Qureshi et al. | |
| 8,312,414 B2 * | 11/2012 | Russell ......................... | 717/100 |
| 8,356,285 B2 * | 1/2013 | Schuba et al. ................ | 717/127 |
| 2005/0120344 A1 * | 6/2005 | Asare et al. ................... | 717/174 |
| 2005/0120347 A1 * | 6/2005 | Asare et al. ................... | 717/177 |
| 2008/0244540 A1 * | 10/2008 | Feblowitz et al. ............ | 717/143 |
| 2009/0113382 A1 * | 4/2009 | Chancey et al. .............. | 717/104 |
| 2009/0319239 A1 * | 12/2009 | Arnold et al. ..................... | 703/6 |
| 2010/0153426 A1 * | 6/2010 | Kim et al. ..................... | 707/765 |
| 2012/0036552 A1 * | 2/2012 | Dare et al. ......................... | 726/1 |
| 2012/0084769 A1 * | 4/2012 | Adi et al. ....................... | 717/174 |

(Continued)

OTHER PUBLICATIONS

Chen et al., IBM Workload Deployer (Mar. 2012) retrieved from http://www.redbooks.ibm.com/redbooks/pdfs/sg248011.pdf on Nov. 29, 2015.*

(Continued)

*Primary Examiner* — Lewis A Bullock, Jr.
*Assistant Examiner* — Theodore Hebert
(74) *Attorney, Agent, or Firm* — Fleit Gibbons Gutman Bongini Bianco PL; Thomas S. Grzesik

(57) ABSTRACT

Various embodiments manage deployable computing environments. In one embodiment, a semantic model of a computing environment is analyzed. The computing environment is deployed based on the analysis of the semantic model. The deployment of the computing environment includes executing one or more automation scripts. One or more changes in a state of the computing environment are identified, for each automation script executed during the deployment of the computing environment, based on executing the automation script. The semantic model is updated based on the one or more changes in state identified for each automation script.

14 Claims, 11 Drawing Sheets

(56) References Cited

U.S. PATENT DOCUMENTS

2012/0192146 A1* 7/2012 Arnold et al. ............... 717/105
2012/0311111 A1* 12/2012 Frew et al. .................. 709/221
2013/0260359 A1* 10/2013 Park et al. .................. 434/362
2013/0332901 A1* 12/2013 Berg et al. .................. 717/121

OTHER PUBLICATIONS

Niaki, A., et al., "Formal heterogeneous system modeling with SystemC", 2012 Forum on Specification and Design Languages, Sep. 2012, pp. 160-167. Print ISBN:978-1-4673-1240-0.

Disclosed Anonymously, "Smart method to generate jobs execution pre-conditions and post-conditions", Published electronically on Jan. 7, 2013. (IPCOM000224814D).

IBM, "SmartCloud, Continuous Delivery Version 2.0", http://pic.dhe.ibm.com/infocenter/sccdhelp/v1r0/index.jsp. Sep. 2, 2014.

DevOps, http://en.wikipedia.org/wiki/DevOps, retrieved Sep. 2, 2014.

IBM, "Tivoli Application Dependency Discovery Manager" http://www-03.ibm.com/software/products/en/tivoliapplicationdependencydiscoverymanager, retrieved Sep. 2, 2014.

Magoutis, K., et al., "Galapagos: Model-driven discovery of end-to-end application—storage relationships in distributed systems". IBM Journal of Research and Development, Sep. 2008 pp. 367-377, vol. 52, No. 4/5. Copyright 2008.

Attariyan, M., et al., "Automating configuration troubleshooting with dynamic information flow analysis", OSDI'10 Proceedings of the 9th USENIX conference on Operating systems design and implementation, Sep. 2010, pp. 1-14.

Crameri, O., et al., "Staged Deployment in Mirage, an Integrated Software Upgrade Testing and Distribution System", SOSP 2007, Oct. 2007, pp. 1-16, Copyright 2007 ACM 978-1-59593-591-5/07/0010.

Whitaker, A., et al., "Configuration Debugging as Search: Finding the Needle in the Haystack", OSDI'04 Proceedings of the 6th conference on Symposium on Operating Systems Design & Implementation, 2004, pp. 1-6.

* cited by examiner

```
202                                                          212
 └─ topology(:rubis) {
204  ┌─ node(:front_end) {
     │    name "RUBiS front-end node"
     └─   description "Serves requests for static content and balances the load to the application tier"

206    ┌─ component(:rubis_front_end) {
       │    name "RUBiS Web fron-end on Apache"
       └─   description  RUBiS static html pages"

property :document_root => "rubis"
            property :jk_servlet_regex => "/rubis/servlet/*"
          }
        }

208  ┌─ node(:app) {
     │    name "RUBiS business logic node"
     └─   description  Runs the bidding system logic, accessing the RUBiS database to generate dynamic content to end-users"

component(:rubis_app) {
            name "RUBiS application logic"
210       description "RUBiS servlets"
          └─
            property :min_threads => 30, :validators => [ range(10, 50) ]
            property :max_threads => 1024, :validators => [ range(128, 2048) ]

property :load_balancer_factor => 1, :validators => [ value_type(:numeric) ]
            property :jk_port => 8009, :validators => [ range(8009, 8012) ]
          }
        }

214  ┌─ node(:db) {
     │    name "RUBiS database node"
     └─   description  Database containing all tables used by the RUBiS application"

component(:rubis_db) {
            name "RUBiS database"
216       description "RUBiS data: users, items, bids, comments, etc."
          └─
            property :sql_schema_file => "http://alpine03.pok.ibm.com/rubis/rubis_small_db.sql.gz",
            property :wait_timeout => "31536000"
          }
        }
      }
```

331
    node (:ubuntu12_10_with_be) { provider(:openstack) {
332         openstack_username properties['openstack']['openstack_username']
            openstack_api_key properties['openstack']['openstack_api_key']
            openstack_auth_url properties['openstack']['openstack_auth_url']
            openstack_tenant properties['openstack']['openstack_tenant']
            openstack_region properties['openstack']['openstack_region']
        }

334     name "ubuntu12.10-with-be"
        property :flavor_id => "1"
336     property :key_pair_name => "default"
        property :security_group_ids => ["default"]
338     property :image => "ubuntu12.10-with-be"

os :linux, :flavor => :ubuntu, :version => '12.10', :architecture => :x86_64
    }
```

FIG. 3

```
578 ─▶ import rubis-app.weaver
        import rubis-pattern.weaver

580 ─▶ topology(rubis_openstack) {
          name "RUBiS three-tier pattern on OpenStack"
          description "RUBiS application on a three-tier pattern: Apache, Tomcat, and MySQL"
581 ─▶    use :rubis_pattern => :pattern
          use :rubis
                                                           583
          realizes rubis.front_end => pattern.apache_server ─▶ 584
582 ─▶    realizes rubis.app => pattern.tomcat_server    ─▶
          realizes rubis.db => pattern.mysql_server       ─▶ 585

586 ─▶    property :rubis_servlets_url => "http://alpine03.pok.ibm.com/rubis/rubis_servlets.jar", :description => 'URL from which the R
          property :rubis_web_url => "http://alpine03.pok.ibm.com/rubis/rubis-static.tgz", :description => "URL from which the RUBiS We 588 ─▶    rubis.app.rubis_app.min_threads = 20
          rubis.app.rubis_app.max_threads = 300

Setting up automation parameters

574 ─▶    rubis.front_end.include "../automation/rubis_frontend_role.weaver"
          frontend_role = rubis.front_end.rubis_frontend_role
          frontend_role.rubis_document_root = rubis.front_end.rubis_front_end.document_root
          frontend_role.rubis_web_source_url = rubis_web_url
          frontend_role.rubis.mod_jk_servlet_regex = rubis.front_end.rubis_front_end.jk_servlet_regex
          frontend_role.rubis.mod_jk_requestlogformat = "%R %V %T"
          frontend_role.rubis.mod_jk_workers = late_binding { all(rubis.app.private.hostname).zip(all(rubis.app.rubis_app.worker_id), al
```

```
rubis.app.include "../automation/rubis_app_role.weaver"
    app_role = rubis.app.rubis_app_role
    app_role.rubis_tomcat_jkport = rubis.app.rubis_app.jk_port
    app_role.rubis_tomcat_jvm_route = rubis.app.rubis_app.worker_id
    app_role.rubis_tomcat_min_threads = rubis.app.rubis_app.min_threads
    app_role.rubis_tomcat_max_threads = rubis.app.rubis_app.max_threads
    app_role.rubis_servlets_source_url = rubis_servlets_url
```
574

```
app_role.rubis_tomcat_db_host = rubis.db.private.hostname
app_role.rubis_tomcat_db_name = 'rubis' rubis.db.include "../automation/rubis_db_role.weaver"
    db_role = rubis.db.rubis_db_role
    db_role.rubis_db_source_url = rubis.db.rubis_db.sql_schema_file
    db_role.mysql_tunable_wait_timeout = rubis.db.rubis_db.wait_timeout
}
```
576

FIG. 5B

```
{
    ''environment_semantic_model'':' '/weaver/projects/rubis-3-tier/rubis-env.weaver'',
    ''environment_id'':' 'production_9872412538'',
    ''node'':' 'apache_server'',
    ''automation_script'': {
      ''type'':' 'chef'',
      ''name'':' 'apache2::default''
    },
    ''packages_installed'': {
      "apache2-mpm-worker/2.2.22-6ubuntu2.3": {
          "name": 'apache2-mpm-worker'',
          "size": "55",
          "version": "2.2.22-6ubuntu2.3"
       }, ...
    },
    ''processes_started'': {
      "apache2/24617": {
          "command": "/usr/sbin/apache2 -k start",
          "user": "root' ',
          ...
       },
       apache2/24618": {
          "command": "/usr/sbin/apache2 -k start",
          "user":' 'www-data' ',
          ...
       }, ...
    },
    ''config_files_read'': [
      "/etc/apache2/apache2.conf",
      "/etc/apache2/mods-available/mod_jk.conf",
      ...
    ],
    ''network'': {
       ports_open: [
         80, 443
       ], ...
    }, ...
}
```

FIG. 7

```
822  rule :apache_server_port do
828    where { environment.flatten_children.select {|c| c.weaver_instance_of?(:node) && c.id = '' /apache_server/} }
834    continuous_validation {
         runtime :type => :cron, :period => 1
         command "/opt/weaver/rules/state_checking_library/check_port.rb 80 443'
       }
       end
824  rule :apache_server_process_21261 do
830    where { environment.flatten_children.select {|c| c.weaver_instance_of?(:node) && c.id = '' /apache_server/} }
836    continuous_validation {
         runtime :type => :cron, :period => 1
         command "/opt/weaver/rules/state_checking_library/check_process.sh root '/usr/sbin/apache2 -k start'"
       }
       end
826  rule :apache_server_process_21261 do
832    where { environment.flatten_children.select {|c| c.weaver_instance_of?(:node) && c.id = '' /apache_server/} }
838    continuous_validation {
         runtime :type => :cron, :period => 1
         command "/opt/weaver/rules/state_checking_library/check_process.sh www-data /usr/sbin/apache2 -k start'"
       }
       end
```

FIG. 8

… # SYSTEMS MANAGEMENT BASED ON SEMANTIC MODELS AND LOW-LEVEL RUNTIME STATE

BACKGROUND

The present disclosure generally relates to systems management, and more particularly relates to improving systems management based on semantic models and low-level runtime state of computing systems.

Managing computer systems is becoming an increasingly difficult task. System deployment, configuration management, software upgrading, and problem determination are examples of typical management tasks, all of which are time-consuming, error-prone, and non-trivial. The difficulty of such tasks is aggravated by the complexity of modern systems comprising a number of distributed and cross-dependent components.

BRIEF SUMMARY

In one embodiment, a method for managing deployable computing environments is disclosed. The method comprises analyzing a semantic model of a computing environment. An instance of the computing environment is deployed based on the analyzing for automatically deriving validation rules as part of a bootstrapping phase. During the bootstrapping deployment, each computing resource of the environment is monitored by one or more introspection agents that run either directly on the computing resources or externally. Changes in state with respect to the baseline state are identified for the computing environment by the plurality of introspection agents. The semantic model is augmented with constructs representing the automatically derived validation rules based on the identified changes in state for the computing environment. The automatically derived validation rules and introspection agents are automatically started during future deployments based on the augmented semantic model. The validation rules continuously verify whether the state of the deployed computing environment complies with the expected state which was observed during the bootstrapping deployment.

In another embodiment, a method for managing deployable computing environments is disclosed. The method comprises analyzing a semantic model of a computing environment. During and after deployments of the computing environment, each computing resource of the environment is monitored by one or more introspection agents that run either directly on the computing resources or externally. Changes in state with respect to the baseline state are identified for the computing environment by the plurality of introspection agents. The semantic model is augmented with constructs representing automatically derived validation rules based on the identified changes in state for the computing environment. The automatically derived validation rules are automatically started after they are derived. The validation rules continuously verify whether the state of the deployed computing environment complies with the expected state which was observed during the deployment.

In another embodiment, an information processing system for managing deployable computing environments is disclosed. The information processing system comprises a memory and a processor communicatively coupled to the memory. A systems manager is communicatively coupled to the memory and the process. The systems manager is configured to perform a method. The method comprises analyzing a semantic model of a computing environment. An instance of the computing environment is deployed based on the analyzing for the purpose of automatically deriving validation rules as part of a bootstrapping phase. During the bootstrapping deployment, each computing resource of the environment is monitored by one or more introspection agents that run either directly on the computing resources or externally. Changes in state with respect to the baseline state are identified for the computing environment by the plurality of introspection agents. The semantic model is augmented with constructs representing the automatically derived validation rules based on the identified changes in state for the computing environment. The automatically derived validation rules and introspection agents are automatically started during future deployments based on the augmented semantic model. The validation rules continuously verify whether the state of the deployed computing environment complies with the expected state which was observed during the bootstrapping deployment.

In a further embodiment, an information processing system for managing deployable computing environments is disclosed. The information processing system comprises a memory and a processor communicatively coupled to the memory. A systems manager is communicatively coupled to the memory and the process. The systems manager is configured to perform a method. The method comprises analyzing a semantic model of a computing environment. During and after deployments of the computing environment, each computing resource of the environment is monitored by one or more introspection agents that run either directly on the computing resources or externally. Changes in state with respect to the baseline state are identified for the computing environment by the plurality of introspection agents. The semantic model is augmented with constructs representing automatically derived validation rules based on the identified changes in state for the computing environment. The automatically derived validation rules are automatically started after they are derived. The validation rules continuously verify whether the state of the deployed computing environment complies with the expected state which was observed during the deployment.

In yet another embodiment, a computer program product for managing deployable computing environments is disclosed. The computer program product comprises a storage medium readable by a processing circuit and storing instructions for execution by the processing circuit for performing a method. The method comprises analyzing a semantic model of a computing environment. An instance of the computing environment is deployed based on the analyzing for the purpose of automatically deriving validation rules as part of a bootstrapping phase. During the bootstrapping deployment, each computing resource of the environment is monitored by one or more introspection agents that run either directly on the computing resources or externally. Changes in state with respect to the baseline state are identified for the computing environment by the plurality of introspection agents. The semantic model is augmented with constructs representing the automatically derived validation rules based on the identified changes in state for the computing environment. The automatically derived validation rules and introspection agents are automatically started during future deployments based on the augmented semantic model. The validation rules continuously verify whether the state of the deployed computing environment complies with the expected state which was observed during the bootstrapping deployment.

In a further embodiment, a computer program product for managing deployable computing environments is disclosed.

The computer program product comprises a storage medium readable by a processing circuit and storing instructions for execution by the processing circuit for performing a method. The method comprises analyzing a semantic model of a computing environment. During and after deployments of the computing environment, each computing resource of the environment is monitored by one or more introspection agents that run either directly on the computing resources or externally. Changes in state with respect to the baseline state are identified for the computing environment by the plurality of introspection agents. The semantic model is augmented with constructs representing automatically derived validation rules based on the identified changes in state for the computing environment. The automatically derived validation rules are automatically started after they are derived. The validation rules continuously verify whether the state of the deployed computing environment complies with the expected state which was observed during the deployment.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 2, 3, 4, 5A, and 5B illustrate various examples of semantic models for a deployable computing environment according to one embodiment of the present disclosure;

FIG. 7 illustrates one example of a portion of introspection data comprising state changes for the deployable computing environment according to one embodiment of the present disclosure;

FIG. 8 illustrates one example of the semantic models of FIGS. 2-5 having been augmented with validation rules based on the state change information shown in FIG. 7 according to one embodiment of the present disclosure;

DETAILED DESCRIPTION

Operating Environment

Figure 1:
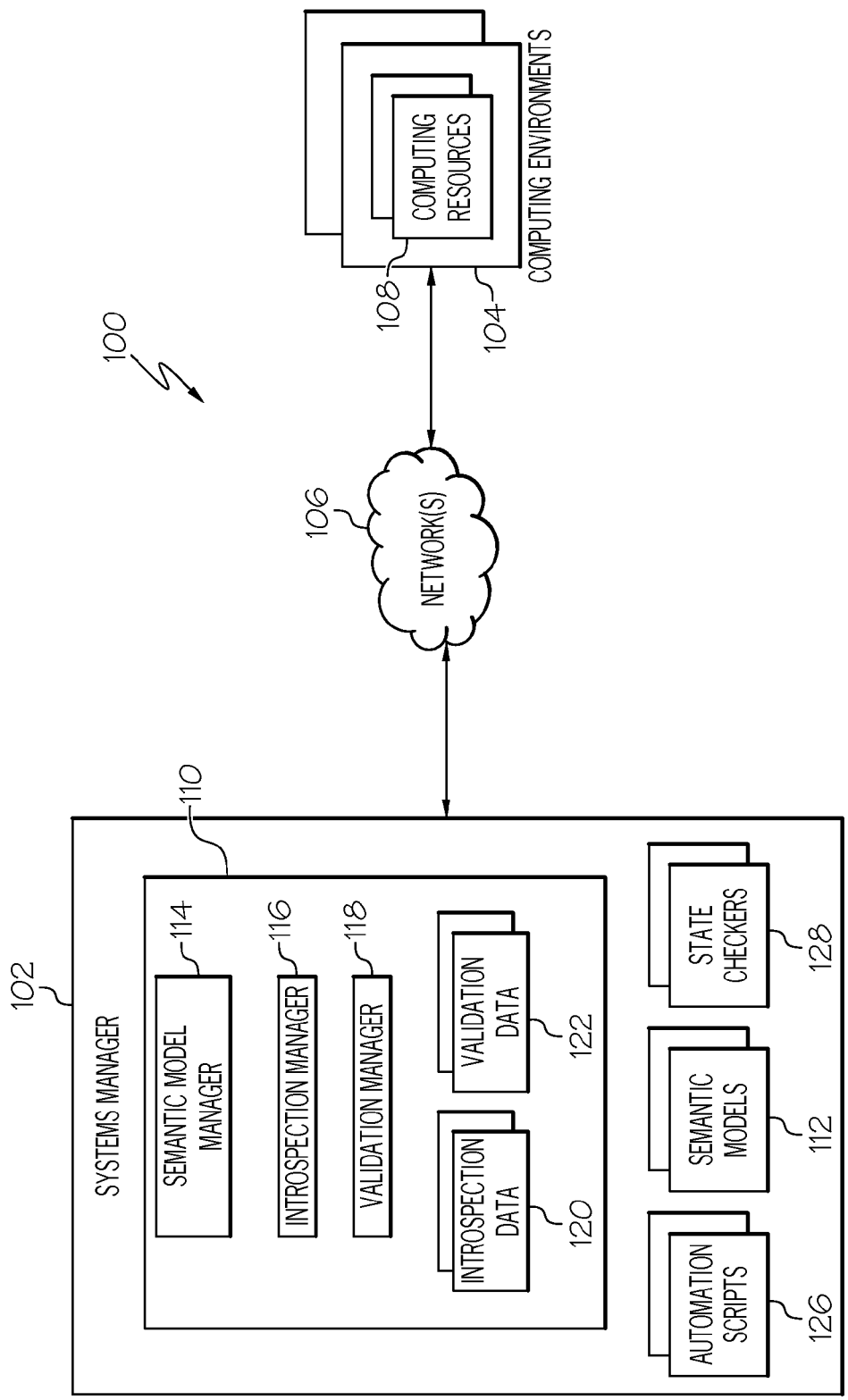
FIG. 1 is a block diagram illustrating one example of an operating environment according to one embodiment of the present disclosure.

FIG. 1 shows one example of an operating environment 100 for improving systems management. In particular, FIG. 1 shows one or more information processing systems 102 and computing environments 104 communicatively coupled to at least one network 106. In one embodiment, the network 106 comprises a local area network (LAN), a general wide area network (WAN), and/or a public network (e.g., the Internet). The computing environments 104 (also referred to herein as "systems 104" and "deployable systems 104") comprise computing resources 108 such as (but not limited to) cloud computing resources (e.g., virtual images, storage volumes, firewalls, etc.), middleware stack, application components (e.g., operating systems, databases, application servers, etc.), hardware resources, networking information, automation scripts, and/or the like. The computing environments 104 can be physical information processing systems; virtual computing environments such as virtual machines executing on one or more physical information processing systems; and/or the like. In some embodiments, the one or more computing environments 104 are cloud-computing environments. However, in other embodiments, these environments 104 are non-cloud computing environments.

The information processing systems 102 comprise a systems manager 110, semantic models 112, automation scripts 126, and state checkers 128. The systems manager 110 comprises a semantic model manager 114, an introspection manager 116, a validation manager 118, introspection data 120, and validation data 122. As will be discussed in greater detail below, the systems manager 110 provides improved and enhanced systems management by correlating high-level system models, such as the semantic models 112, and low-level runtime systems states as captured by the introspection data 120. Semantic models 112 are models that describe a computing environment 104 (which may or may not be already deployed/instantiated) in terms of its architecturally significant components. These models 112 are also executable serving as the infrastructure code for automating system deployment and configuration.

In one embodiment, a semantic model 112 describes a target system (computing environment) as a topology encompassing a collection of building blocks that are composed together. Building blocks can be divided into at least two categories such as semantic and automation. Semantic building blocks include, for example, cloud resources (virtual images, storage volumes, firewall, etc.) as well as the middleware stack and application components. Automation building blocks comprise automation logic used to install and configure various system components. Automation logic can be in the form of scripts, Chef recipes, Puppet manifests, and/or the like. Semantic models 112 are described in a modeling language such as (but not limited to) a Ruby-based Domain Specific Language (DSL) for system modeling.

Semantic models 112 are processed by a systems manager 110 for model validation, system deployment, and configuration automation. In one embodiment, the systems manager 110 validates the modeled system topology, as provided by the semantic models 112, for correctness at design time. This ensures that no requirements are missing and that the constituent building blocks are compatible and can be put together harmonically without violating any constraint. Detecting problems before deployment can save time that would otherwise be spent debugging a complex running system.

In addition to validating the modeled system topology, the systems manager 110 also performs a bootstrapping/introspection phase. In this phase/stage, based on its semantic models 112 the computing environment is deployed: computing resources are instantiated if necessary and configured (virtual machines are created, storage volumes are created and/or attached, network configuration is performed, and/or the like); automation scripts 126 are executed on the computing resources to install and/or configure the entire software stack described by the semantic models 112. During the bootstrapping/introspection phase, the system deployment is performed to automatically generate validators that will continuously run on future deployments of the environment as validation agents 124 to continuously check the correctness of the environment. During the bootstrapping stage, the systems manager 110 performs one or more discovery/introspection operations on the deployed system. These discovery/introspection operations allow the systems manager 110 to inspect the deployed system to discover how automation scripts 126 change the system state. For example, the systems manager 110 obtains information such as (but not limited to) a list of processes started and/or stopped; a list of network ports opened and/or closed; a list of general files modified, created, and/or deleted; a list of modifications made to files; and a list of software packages installed.

The systems manager 110 augments the semantic model 112 of a computing environment 104 with information obtained during the introspection process such as (but not limited to) semantic model constructs that represent validation rules to be automatically started and continuously run as validation agents on future deployments of the environment; and state changes performed by each automation script referenced by the semantic model. Correlating the discovered information with elements of the semantic model allows a number of techniques to be created and performed for improving systems management. For example, validation operations can be automatically discovered/generated to continuously check the correctness of a deployed computing environment; an operator can be assisted in determining the root-cause of a system malfunction; and suggestions can be provided to the operator regarding a course of action to fix a system problem. In one embodiment, recommending a fix to the operator is based on the linkage between semantic model nodes and the discovered state changes performed by automation scripts on the computing resources 108 represented by the nodes.

Correlating Semantic Models with Introspection Data

The following is a more detailed discussion on correlating semantic models of computing environments 104 with associated introspection data for improving systems management. In one embodiment, the systems manager 110 processes one or more semantic models 112. Semantic models are provided by users and written in a modeling language such as (but not limited to) a Ruby-based DSL. The model describes a computing environment in terms of the required infrastructure resources, the software stack to run on these resources, and the automation scripts used to deploy and/or configure the software stack on the infrastructure resources. Infrastructure resources include (but are not limited to) virtual and/or physical servers, network, and storage. A semantic model 112 is in effect an executable model that not only describes a computing environment 104 as a topology encompassing a collection of semantic and automation elements, but also triggers the creation and/or configuration of the infrastructure resources (part of the computing resources 108) of a computing environment 104, and triggers the execution of automation scripts 126 to deploy and/or configure the software stack on the infrastructure resources. The result of the semantic model execution is a deployed and/or configured computing environment 104 (also referred to as a "system").

A semantic model 112 expresses a desired state of a computing environment 104 in terms of its resources, services, and software. A semantic model 112 also references automation scripts needed to implement and maintain the desired state. A computing environment 104 comprising applications and its infrastructure is managed as a unit. Computing environments 104 can be deployed in support of development and test activities, and for running a production system. A semantic model 112 expresses all relevant resources for an environment 104 such as servers, storage, software components, automation scripts, etc. The semantic model 112 is executed by a runtime (systems manager 110), which creates and modifies the modeled computing environment 104 by executing the semantic model 112. The runtime coordinates the creation or modification of the resources described by the semantic model 112 via a net of platform-specific providers which implement the interactions with, for example, target clouds.

FIGS. 2-5 show various examples of semantic models. In these examples, the models 212, 312, 412, and 512 utilize a Ruby-based DSL; however, other modeling languages are applicable as well. FIG. 2 shows one example of a semantic model 212 representing an application topology 202 of a computing environment. The semantic model 212 of FIG. 2 comprises a plurality of computing resources 204, 208, 214, which are represented as a node. Each computing resource comprises a name, a description, and application components such as 206, 210, and 216 in FIG. 2. Each application component comprises a name, a description, and properties whose values are used to configure the component at deployment/configuration time.

FIG. 3 shows one example of a semantic model 312 representing a virtual image 331 of a target cloud environment. The semantic model 312 comprises: a representation of cloud-specific connection and authentication parameters 332, used when the deployment is performed; properties 334 comprising default values for parameters representing key characteristics of virtual servers to be created from the virtual image; a property 336 whose value matches the unique identification of the image in the cloud; and the specification 338 of the characteristics/attributes of the operating system installed on the image.

Figure 4:
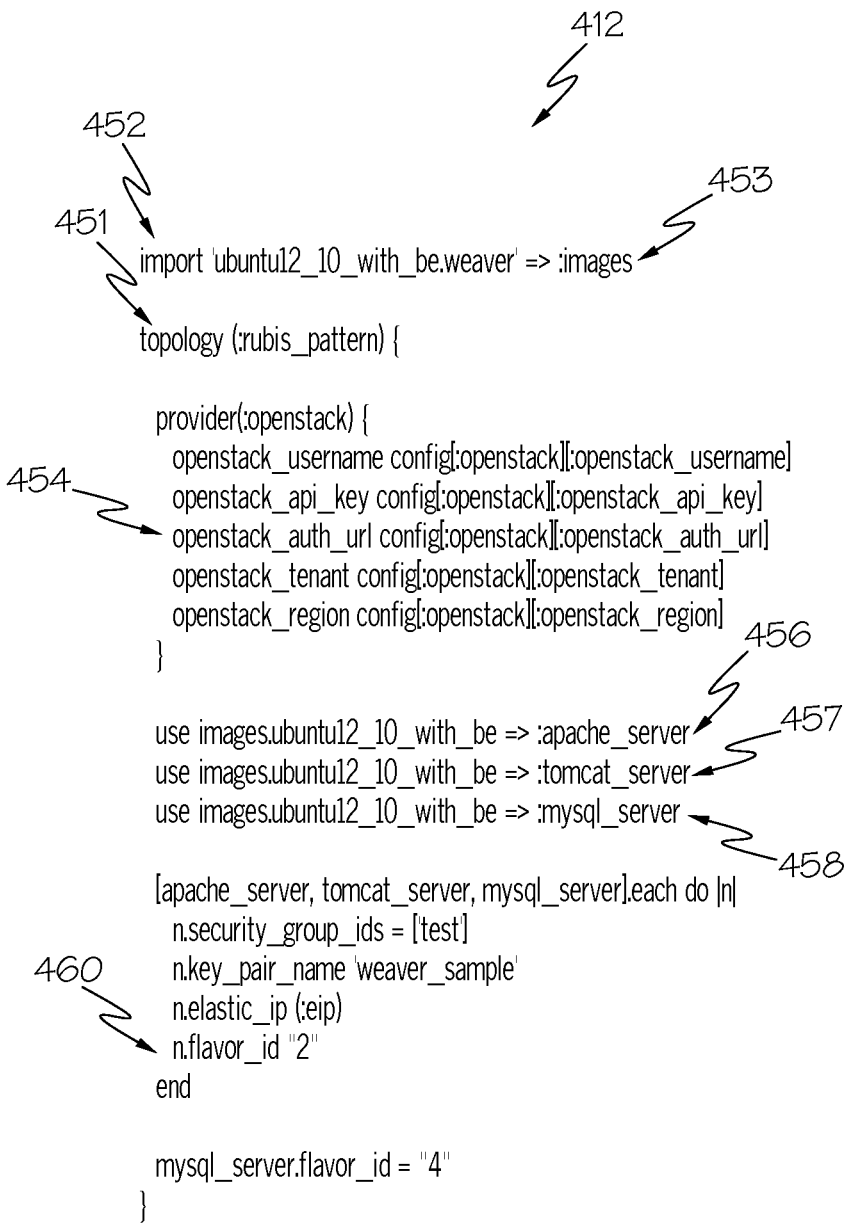

FIG. 4 shows one example of a semantic model 412 representing an infrastructure topology 451 of a computing environment. The semantic model 412 comprises an import statement 452 that effectively incorporates the semantic model 312 of FIG. 3 in its entirety. Furthermore, the statement 452 declares that the semantic model 312 can be referred to by the semantic model 412 using the symbol images 453. The semantic model 412 comprises cloud-specific connection and authentication parameters 454, used when the deployment is performed. The semantic model 412 also creates three distinct references 456, 457, 458 to the virtual image represented by the semantic model 312 of FIG. 3, which in effect represents 3 computing resources as nodes in the semantic model 412 by the symbols apache_server (456), tomcat_server (457), and mysql_server (458). The semantic model 412 finally assigns values to key cloud-specific parameters for each of the three computing resources. Upon deployment, these computing resources are instantiated as virtual servers from the virtual image represented by the semantic model 312 of FIG. 3.

FIGS. 5A and 5B shows one example of a semantic model 512 representing a computing environment topology 580 that ties together the application topology 202, the infrastructure topology 451, as well as automation scripts 126 referenced by the semantic model 512 in 572, 574, and 576. The semantic model 512 comprises import statements 578 that incorporate both the application topology 202 and the infrastructure topology 451. The environment topology 580 comprises a name and a description. The topology 580 declares a reference by the symbol pattern 581 to the infrastructure topology 451 and a reference 582 by the symbol rubis to the application topology 202. The statements 583, 584, and 585 map each node of the application topology 202 onto a corresponding node of the infrastructure topology 412. In particular, the logical application node front_end corresponds to the infrastructure node apache_server; the logical application node app corresponds to the infrastructure node tomcat_server; and the logical application node db corresponds to the infrastructure node mysql_server. As a result of these mappings, the environment topology 580 comprises 3 computing resources represented as nodes. Each node is associated with the virtual image represented by the semantic model 312. Furthermore, the node apache_server (or front-end) comprises the application component 206 (rubis_front_end); the node tomcat_server (or app) comprises the application component 210 (rubis_app); and the node mysql_server (or db) comprises the application component 216 (rubis_db). The environment topology 580 also defines properties 586 that can be referred to by other elements of the semantic model 512. In addition, in statements 588, the environment topology 580 overrides the values of two of the properties defined by component 210 (rubis_app) in semantic model 212. Finally, code blocks 572, 574, and 576 select automation scripts from the plurality of scripts 126 to be used to deploy the application components 206, 210, and 216 to the nodes front_end (which corresponds to apache_server), app (which corresponds to tomcat_server), and db (which corresponds to mysql_server), respectively. Values of parameters of the automation scripts are also set by code blocks 572, 574, and 576. These values will be consumed by the scripts upon their execution at deployment time.

Figure 6:
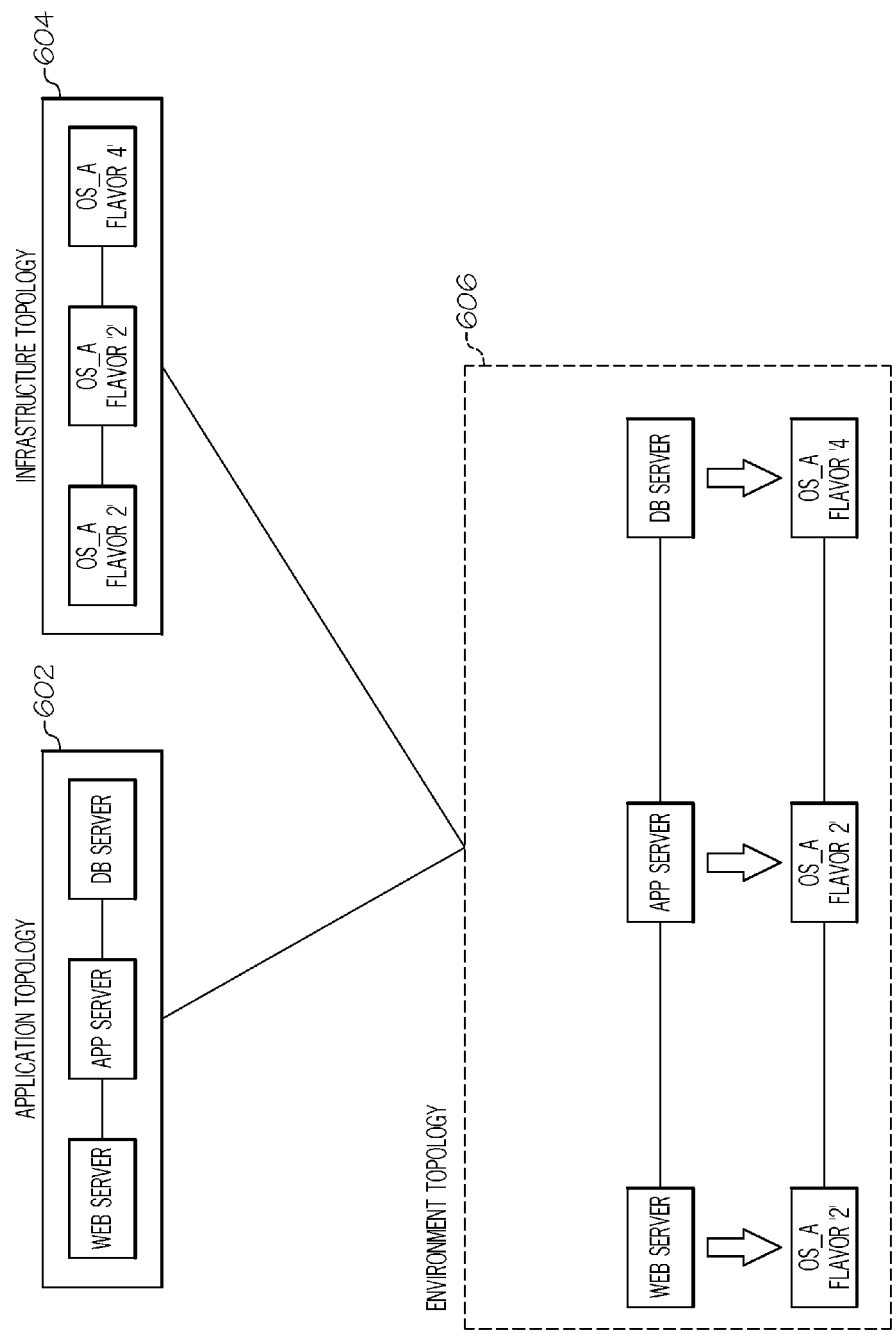
FIG. 6 illustrates one example of various topologies of the deployable computing environment described by the semantic models of FIGS. 2-5 according to one embodiment of the present disclosure.

The semantic model manager 114 of the systems manager 110 analyzes semantic models 112 and identifies the application topology and infrastructure topology of the modeled computing environment (system). In one embodiment, the combination of the application topology and infrastructure topology creates an environment topology for the modeled system as described above. FIG. 6 shows a graphical and summarized depiction of the topologies represented by the semantic models 212, 312, 412, and 512. In particular, FIG. 6 shows graphically an application topology 602, an infrastructure topology 604, and an environment topology 606 identified by the semantic model manager 114 based on the semantic models 212, 312, 412, and 512 of FIGS. 2-5, respectively. The application topology 602 comprises the web server software and data, the application server software and data, and the database server software and data. The infrastructure topology 604 comprises three virtual servers with the same operating system. Two servers have the same CPU/memory/storage configuration (represented by flavor "2"), whereas the other server has more CPU/memory/storage capacity (represented by flavor "4"). The application topology 602 and the infrastructure topology 604 are combined to create an environment topology 606, which defines the relationships between the application topology nodes and the infrastructure topology nodes. For example, the environment topology 606 shows that the web server software will run (after deployment) on the first virtual server, the application server software will run on the second virtual server, and the database server software will run on the third virtual server.

After analyzing the semantic models 112, the systems manager 110 deploys the modeled computing environment. In one embodiment, an initial deployment is performed as part of a bootstrapping phase. The systems manager 110 first creates an in-memory model of the desired environment from the semantic models 112. The in-memory model is then analyzed to identify relationships between property values and dependencies. The dependencies are used to derive coordination requirements used during software configuration. Finally, the in-memory model is traversed to create or modify resources using a set of external services and platform providers, which provide target cloud specific resource implementations. As virtual machine (VM) instances (virtual servers) start they execute a startup script to configure the software based on the automation script(s). The software configuration is coordinated between instances (cross-configuration) to ensure that property values needed by automation scripts are propagated between instances (when not locally set) and available when and where they are needed.

The introspection manager 116 injects an introspection agent on each virtual server before the execution of the automation scripts begins. In one embodiment, the automation scripts are Chef recipes and the introspection agent comprises code that watches the Chef runtime by means of aspects (Aspect-Oriented Programming). Using aspects, the introspection agent intercepts the start and end of the execution of each Chef recipe. Before and after the execution of each Chef recipe, the introspection agent takes a snapshot of the current system state of the virtual server where it runs. The introspection agent calculates the delta between the first and last snapshots to determine what system state changes were made by the automation scripts that ran on that virtual server. The introspection agent also calculates the delta between snapshots taken before and after the execution of each Chef recipe.

Examples of system state information detected by the introspection agents as part of the above interception process include (but are not limited to) an identification of creation, modification, and/or deletion of: software packages; general files/directories; configuration files; environment variables; processes; operating system services; the network state (e.g., ports, sockets, etc.); network settings (e.g., route tables, interfaces, etc.); general system configuration (e.g., users, groups, cron jobs, security configuration, etc.); logging information; and/or the like. The introspection agents detect system state information based on, for example, command-line tools; system-level runtime library interception (layer between user-level code and system calls); automation runtime interception; specialized agents; and combination of the above; and/or the like.

The introspection manager 116 collects the state changes detected for each automation script and stores it, in one embodiment, as a JSON document as part of the introspection data 120. For instance, FIG. 7 shows the example of a portion of introspection data 720 that resulted from the execution of an automation script to install and configure the Apache Web server on one virtual server. The sample introspection data 720 indicates that: the software package 722 named "apache2-mpm-worker" was installed; the process 724 was started by the user "root" with the command "/usr/bin/apache2 -k start"; the process 726 was started by the user "www-data" with the command "/usr/bin/apache2 -k start"; the network ports 80 and 443 were open, as represented by the piece of data 728. Similar introspection data is stored for each automation script run on each virtual server for the computing environment.

The validation manager 118 analyzes the delta between the execution of the first and last automation scripts on each virtual server for the given computing environment. This delta corresponds to the state reached by the system after the entire deployment has ended, .i.e., after all automation scripts finished running. Based on this analysis, the validation manager 118 automatically generates validation rules whose purpose is to continuously check if the system will not deviate from that observed state, and stores these rules as part of the validation data 122 which, in effect, augments the semantic models of the computing environment.

Given the introspection data 720, the validation manager 118 identifies that the virtual server where the software "Apache" was installed and configured (apache_server 730) ended up with two open ports (80 and 443) 728. It also identifies that the same virtual server have the processes 724 and 726 running. In order to check that those ports remain open and those processes continue running, the validation manager generates the validation data 820 comprising three rules 822, 824, and 826. The validation data 820 is incorporated into the environment semantic model 512. Although the validation rules 822, 824, and 826 are written in a Ruby-based DSL, other representations could be used.

Each rule comprises a "where" clause. The "where" clauses 828, 830, and 832 specify that, when these rules are evaluated by the semantic model manager 114 prior to a deployment, they must run on nodes identified in the semantic model as "apache_server". The rules also comprise a "continuous_validation" block. Each continuous validation block specifies a command that must run to check the status of one state type. The command is chosen from a library of state checkers 128 based on the type of state associated with the rule. For instance, rule 822, which is meant to check if a given list of ports is opened, specifies that the command 834 "check_port.rb" (which is part of the library of state checkers 128) must be run. This command takes as parameters a list of ports whose statuses it will check. Rules 824 and 826, on the other hand, are associated with the process state type and, therefore, the respective commands 836 and 838 refer to the command "check_process.sh" (which is part of the library of state checkers 128). The first parameter of such a command is a user name; the second parameter is a full command line. The "check_process.sh" command checks if a process is running such that it was started by the identified user with the specified full command line. The continuous validation blocks of rules 822, 824, and 826 specify that the rules should be run as "cron jobs" every minute. It should be noted that other mechanisms to run the rules (besides "cron") are also applicable as well In the embodiment where a separate bootstrapping phase is used to derive these validation rules, the rules are encoded as exemplified in FIG. 8, which in effect ties them to the environment topology. When the corresponding computing environment is deployed for real, the systems manager 110 executes the semantic model and computes the target of each validation (based on the "where clauses"). The programs that implement the commands that belong to the library of state checkers 128 are copied to the computing resources where they will need to run. Each computing resource that is target of at least one validation rule is then configured to continuously run the command specified in the rule using the specified runtime (e.g., cron) at the specified frequency (e.g., every minute). In another embodiment, no bootstrapping phase is needed. Rather, when the system is deployed, validation rules are automatically generated as explained in detail previously. After the validation rules are automatically generated during the deployment, they are configured to continuously run using the specified runtime at the specified frequency.

The validation rules, in one embodiment, run as cron jobs and check the current state of the computing environment against the expected state (e.g., ports 80 and 443 should be open). As shown in FIG. 8, the expected state is given as a list of parameters to the programs running as specified in the validation rules. As stated before, each program in the state checkers library 128 is specialized in checking the current status of a particular state type (e.g., network ports). In one embodiment, the output of the state checkers running on the computing resources is sent to stdout (standard output) and produced as a text indicating either "success" or "failure". In the latter case, the state checker 128 can indicate what the current status of the checked state is and what it should have been. The output of the state checkers is captured, in one embodiment, by a wrapper code. In this case, the actual entry points for the cron jobs of each validation rule is this wrapper which in turn executes the validation rule command. When the command (state checker) indicates a failure, its output is captured by the wrapper; then, the wrapper notifies the validation manager 118 which in turn notifies one or more operators by sending an alert stating: what validation rule failed; what computing environment is affected; what node (computing resource) is affected; what the status was for that particular state type; and/or what the status should have been. In one embodiment, the alert is sent as an email message. In another embodiment, the alert is sent as a message to a specific IRC channel. Other alert mechanisms could also be used in other embodiments.

In one embodiment, when the validation manager 118 receives a failure indication from one or more validation rules, it determines whether or not the affected system state is part of any snapshot state delta stored as introspection data 120 for each automation script that was executed when the affected computing environment was deployed (either during a bootstrapping phase or not). As discussed above, the state changes made by each automation script are discovered by taking a system state snapshot before and after the script execution, which is done either during a bootstrapping phase or during a real deployment. If the non-compliant state is part of the state established by one or more automation scripts executed to deploy the computing environment, the validation manager suggests to the operator that a possible fix to the problem is to re-run the corresponding automation script(s), in the order they were originally run at deployment time. For instance, if the introspection manager discovered that a certain automation script had opened port 80 on a certain computing resource, then whenever a validation rule detects that this port is closed the validation manager suggests that the operator should re-run that automation script on the affected computing resource.

One or more embodiments discussed above improve systems management by combining the benefits of a semantic model describing the relevant aspects of a modeled computing environment with additional knowledge acquired via discovery/introspection performed on deployed instance of the environment running system. The semantic model is augmented with relevant knowledge about runtime state and runtime dependencies observed/learned from the discovery process. All the acquired knowledge is used to automatically instrument the computing environment with validation operations that continuously verify the system correctness. If the computing environment malfunctions, the acquired knowledge is utilized to assist system administrators and operators to diagnose the root cause of the problem, and can also provide them with possible solutions to the diagnosed problem.

Operational Flow Diagram

Figure 9:
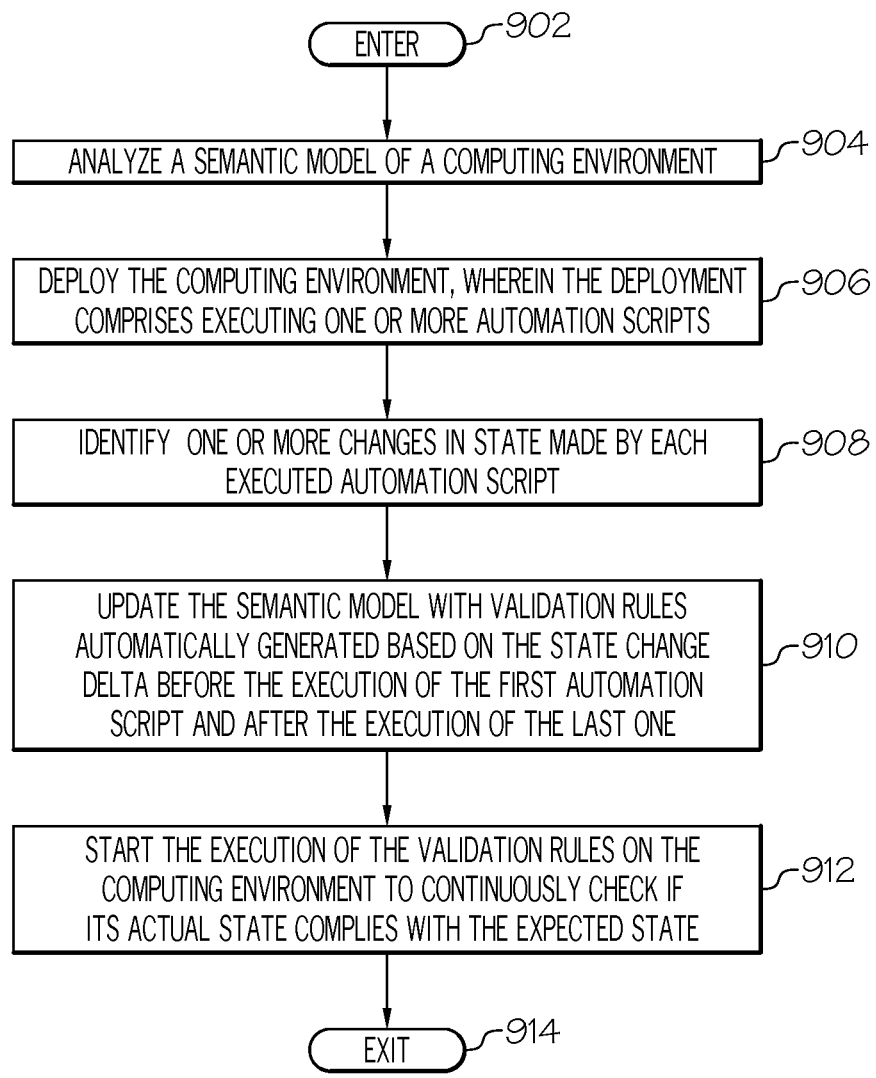
FIG. 9 is an operational flow diagram illustrating one example of managing deployable computer environments according to one embodiment of the present disclosure.

FIG. 9 is an operational flow diagram illustrating one example of managing deployable computing environments. The operational flow diagram of FIG. 9 begins at step 902 and flows directly to step 904. The systems manager 110, at step 904, analyzes a semantic model 112 of a computing environment 104. The systems manager 110, at step 906, deploys the computing environment 104. The deployment of the computing environment comprises executing one or more automation scripts. The systems manager 110, at step 908, observes, during the deployment, how each executed automation script changes the system state of the computing environment 104. The systems manager 110, at step 910, augments the semantic model 112 with validation rules automatically generated based on the state changes detected between the point in time prior to the execution of the automation scripts and the point in time after the execution of the last automation script. The systems manager 110, at step 912, configures the computing environment 104 to continuously run the generated validation rules to monitor its state. The control flow exits at step 914.

Information Processing System

Figure 10:
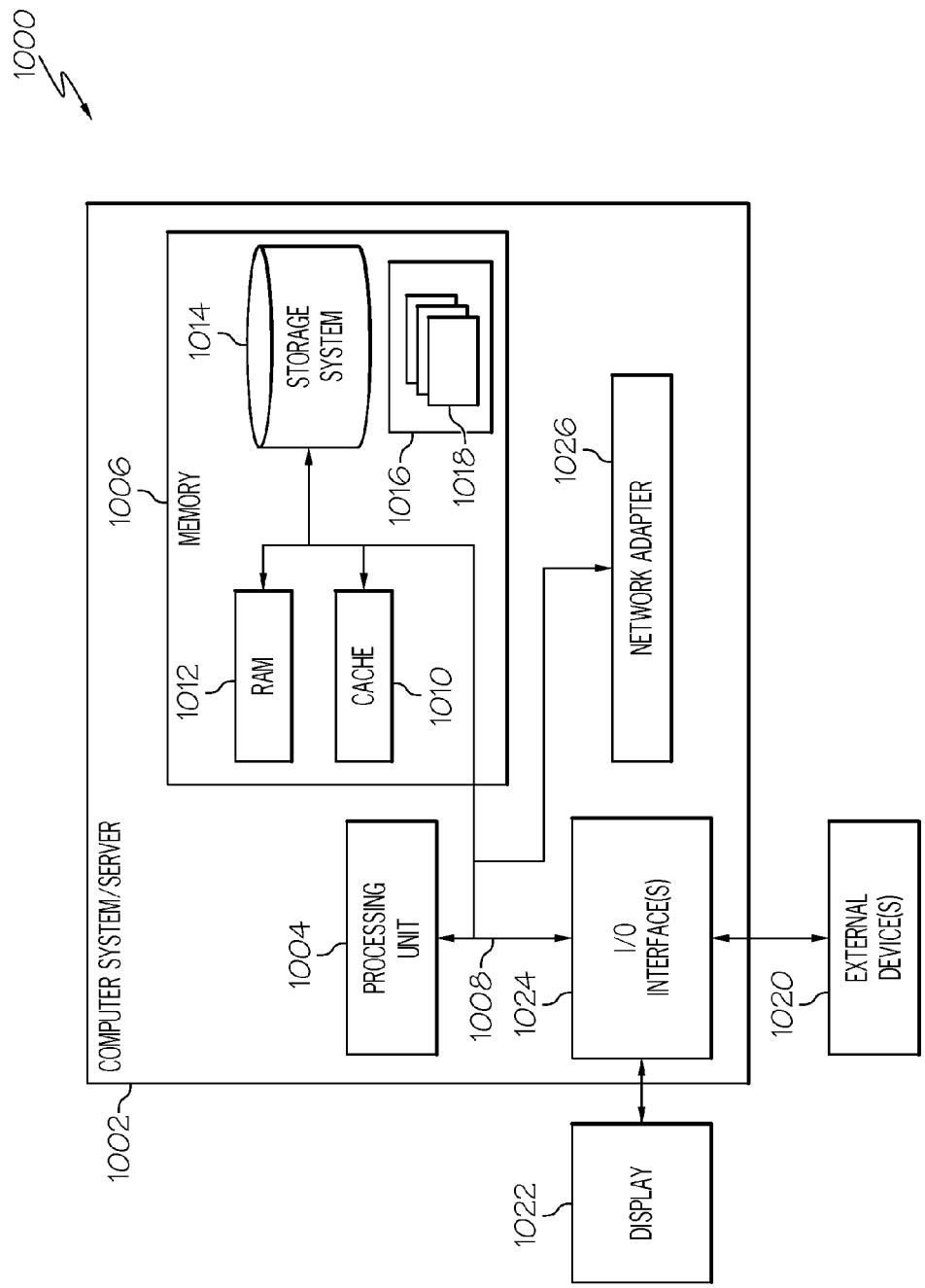
FIG. 10 is a block diagram illustrating a detailed view of an information processing system according to one embodiment of the present disclosure.

Referring now to FIG. 10, this figure is a block diagram illustrating an information processing system, such as the information processing system 102 shown in FIG. 1, which can be utilized in various embodiments of the present disclosure. The information processing system 802 is based upon a suitably configured processing system configured to implement one or more embodiments of the present disclosure. Any suitably configured processing system can be used as the information processing system 1002 in embodiments of the present disclosure. The components of the information processing system 1002 can include, but are not limited to, one or more processors or processing units 1004, a system memory 1006, and a bus 1008 that couples various system components including the system memory 1006 to the processor 1004.

Although not shown in FIG. 10, the systems manager 110 discussed above with respect to FIG. 1 can reside within the main memory 1006 and/or the processor 1004. This component can also be a separate hardware component as well. The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1008 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 1006 can include at least one program product having a set of program modules that are configured to carry out the functions of an embodiment of the present disclosure.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of embodiments of the present disclosure.

The information processing system 1002 can also communicate with one or more external devices 1020 such as a keyboard, a pointing device, a display 51022, etc.; one or more devices that enable a user to interact with the information processing system 5122; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 5122. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing deployable computing environments, the method comprising:
   analyzing a semantic model of a computing environment;
   performing, based on the analyzing, an initial deployment of the computing environment, wherein the deploying executes one or more automation scripts;
   identifying, for each automation script executed during the deployment of the computing environment, one or more changes in a state of the computing environment that has occurred based on executing the automation script;

identifying the one or more changes in the state of the computing environment as an expected stated of the computing environment; and updating the semantic model based on the one or more changes in state identified for each automation script, wherein the updating comprises adding at least one validation operation to the semantic model for each change in state that has been identified, wherein upon subsequent deployments of the computing environment, based on the updated semantic model, the at least one validation operation automatically configures at least one computing resource of the computing environment to automatically monitor a given change in state of the computing environment and determine if the given change in state complies with the expected state of the computing environment identified during the initial deployment of the computing environment.

2. The method of claim 1, wherein the semantic model identifies a set of computing resources and a set of automation scripts associated with the computing environment.

3. The method of claim 1, further comprising:
deploying the computing environment based on the updated semantic model, wherein the deploying comprises configuring the computing environment to continuously run the at least one validation operation.

4. The method of claim 3, further comprising:
determining, based on executing the at least one validation operation, that a current state of the computing environment fails to correspond to the expected state; and
notifying at least one user that the current state of the computing environment fails to correspond to the desired state.

5. The method of claim 1, wherein the deploying further comprises:
selecting at least one deployment configuration from a plurality of different deployment configurations generated based on the analyzing, wherein the at least one deployment configuration comprises the one or more automation scripts and at least one value for each of a set of parameters associated with the one or more automation scripts.

6. An information processing system for managing deployable computing environments, the information processing system comprising:
a memory;
a processor communicatively coupled to the memory; and
a systems manager communicatively coupled to the memory and the processor, wherein the systems manager is configured to perform a method comprising:
analyzing a semantic model of a computing environment;
performing, based on the analyzing, the computing environment, wherein the deploying executes one or more automation scripts;
identifying, for each automation script executed during the deployment of the computing environment, one or more changes in a state of the computing environment that has occurred based on executing the automation script; and
identifying the one or more changes in the state of the computing environment as an expected stated of the computing environment; and
updating the semantic model based on the one or more changes in state identified for each automation script, wherein the updating comprises adding at least one validation operation to the semantic model for each change in state that has been identified, wherein upon subsequent deployments of the computing environment, based on the updated semantic model, the at least one validation operation automatically configures at least one computing resource of the computing environment to automatically monitor a given change in state of the computing environment and determine if the given change in state complies with the expected state of the computing environment identified during the initial deployment of the computing environment.

7. The information processing system of claim 6, wherein the semantic model identifies a set of computing resources and a set of automation scripts associated with the computing environment.

8. The information processing system of claim 6, further comprising:
deploying the computing environment based on the updated semantic model, wherein the deploying comprises configuring the computing environment to continuously run the at least one validation operation.

9. The information processing system of claim 8, further comprising:
determining, based on executing the at least one validation operation, that a current state of the computing environment fails to correspond to the expected state; and
notifying at least one user that the current state of the computing environment fails to correspond to the desired state.

10. A computer program product for managing deployable computing environments, the computer program product comprising:
a non-transitory storage medium readable by a processing circuit and storing instructions for execution by the processing circuit for performing a method comprising:
analyzing a semantic model of a computing environment;
performing, based on the analyzing, the computing environment,
wherein the deploying executes one or more automation scripts;
identifying, the one or more changes in the state of the computing environment as an expected stated of the computing environment; and
updating the semantic model based on the one or more changes in state identified for each automation script, wherein the updating comprises adding at least one validation operation to the semantic model for each change in state that has been identified, wherein upon subsequent deployments of the computing environment, based on the updated semantic model, the at least one validation operation automatically configures at least one computing resource of the computing environment to automatically monitor a given change in state of the computing environment and determine if the given change in state complies with the expected state of the computing environment identified during the initial deployment of the computing environment.

11. The computer program product of claim 10, wherein the semantic model identifies a set of computing resources and a set of automation scripts associated with the computing environment.

12. The computer program product of claim 10, further comprising:

deploying the computing environment based on the updated semantic model, wherein the deploying comprises configuring the computing environment to continuously run the at least one validation operation.

13. The computer program product of claim 10, further comprising:
    determining, based on executing the at least one validation operation, that a current state of the computing environment fails to correspond to the expected state; and
    notifying at least one user that the current state of the computing environment fails to correspond to the desired state.

14. The computer program product of claim 10, wherein the deploying further comprises:
    selecting at least one deployment configuration from a plurality of different deployment configurations generated based on the analyzing, wherein the at least one deployment configuration comprises the one or more automation scripts.

\* \* \* \* \*